(12) United States Patent
McCormick, Jr.

(10) Patent No.: US 9,442,861 B2
(45) Date of Patent: Sep. 13, 2016

(54) SYSTEM AND METHOD FOR OUT-OF-ORDER PREFETCH INSTRUCTIONS IN AN IN-ORDER PIPELINE

(75) Inventor: James Earl McCormick, Jr., Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 13/995,907

(22) PCT Filed: Dec. 20, 2011

(86) PCT No.: PCT/US2011/066276
§ 371 (c)(1),
(2), (4) Date: Jun. 19, 2013

(87) PCT Pub. No.: WO2013/095401
PCT Pub. Date: Jun. 27, 2013

(65) Prior Publication Data
US 2014/0195772 A1    Jul. 10, 2014

(51) Int. Cl.
G06F 12/10    (2016.01)
G06F 9/30    (2006.01)
G06F 9/38    (2006.01)
G06F 12/08    (2016.01)

(52) U.S. Cl.
CPC ....... *G06F 12/1027* (2013.01); *G06F 9/30047* (2013.01); *G06F 9/383* (2013.01); *G06F 12/0862* (2013.01); *G06F 12/1009* (2013.01); *G06F 2212/654* (2013.01); *G06F 2212/684* (2013.01)

(58) Field of Classification Search
CPC .... G06F 12/10; G06F 9/3017; G06F 9/3812; G06F 9/383; G06F 9/3842; G06F 9/3865; G06F 9/06; G06F 9/38; G06F 12/00; G06F 9/30

USPC ................ 711/202, 203, 205, 137, E12.004, 711/E12.057, E12.058; 712/18, 230
See application file for complete search history.

(56) References Cited

U.S. PATENT DOCUMENTS

| | | | |
|---|---|---|---|
| 5,560,029 A | 9/1996 | Papadopoulos et al. | |
| 5,768,575 A * | 6/1998 | McFarland et al. | 712/228 |
| 6,247,115 B1 * | 6/2001 | Janik | G06F 9/3836 712/214 |

(Continued)

OTHER PUBLICATIONS

Office action and Search Report with English translation of Search Report from Taiwan Patent Application No. 101142862, mailed Nov. 24, 2014, 21 pages.

(Continued)

*Primary Examiner* — Pierre-Michel Bataille
(74) *Attorney, Agent, or Firm* — Nicholson De Vos Webster & Elliott LLP

(57) ABSTRACT

Apparatuses, systems, and a method for providing a processor architecture with data prefetching are described. In one embodiment, a system includes one or more processing units that include a first type of in-order pipeline to receive at least one data prefetch instruction. The one or more processing units include a second type of in-order pipeline having issues slots to receive instructions and a data prefetch queue to receive the at least one data prefetch instruction. The data prefetch queue may issue the at least one data prefetch instruction to the second type of in-order pipeline based upon one or more factors (e.g., at least one execution slot of the second type of in-order pipeline being available, priority of the data prefetch instruction).

19 Claims, 7 Drawing Sheets

(56) References Cited

U.S. PATENT DOCUMENTS

| | | | |
|---|---|---|---|
| 6,490,658 B1 | 12/2002 | Ahmed et al. | |
| 7,286,548 B1* | 10/2007 | Jair | H04L 49/901 |
| | | | 710/60 |
| 7,415,633 B2 | 8/2008 | Jamil et al. | |
| 7,624,248 B1* | 11/2009 | Wentzlaff et al. | 711/202 |
| 2003/0233530 A1 | 12/2003 | Boivie et al. | |
| 2005/0055541 A1* | 3/2005 | Aamodt | G06F 9/30101 |
| | | | 712/217 |
| 2006/0136696 A1* | 6/2006 | Grayson | G06F 12/1027 |
| | | | 711/206 |
| 2006/0143401 A1 | 6/2006 | Doweck et al. | |
| 2009/0182976 A1 | 7/2009 | Agesen | |
| 2010/0306477 A1* | 12/2010 | Luttrell | G06F 9/383 |
| | | | 711/137 |
| 2012/0198176 A1* | 8/2012 | Hooker et al. | 711/137 |

OTHER PUBLICATIONS

PCT/US2011/066276 Notification of Transmittal of the International Search Report and the Written Opinion of the International Searching Authority, mailed Jul. 30, 2012, 5 pages.

PCT/US2011/066276 Notification Concerning Transmittal of International Preliminary Report on Patentability, mailed Jul. 3, 2014, 6 pages.

Notice of Allowance from Taiwan Patent Application No. 101142862, mailed Jul. 28, 2015, 2 pages.

* cited by examiner

SYSTEM AND METHOD FOR OUT-OF-ORDER PREFETCH INSTRUCTIONS IN AN IN-ORDER PIPELINE

CROSS-REFERENCE TO RELATED APPLICATION

This patent application is a U.S. National Phase Application under 35 U.S.C. §371 of International Application No. PCT/US2011/066276, filed Dec. 20, 2011, entitled SYSTEM AND METHOD FOR OUT-OF-ORDER PREFETCH INSTRUCTIONS IN AN IN-ORDER PIPELINE.

TECHNICAL FIELD

Embodiments of the invention relate to out-of-order prefetch instructions in an in-order pipeline of a processor architecture.

BACKGROUND

Processor performance has been increasing faster than memory performance for a long time. This growing gap between processor and memory performance means that today most processors spend much of their time waiting for data. Modern processors often have several levels of on-chip and possibly off-chip caches. These caches help reduce data access time by keeping frequently accessed lines in closer, faster caches. Data prefetching is the practice of moving data from a slower level of the cache/memory hierarchy to a faster level before the data is needed by software. Data prefetching can be done by software. Data prefetching can also be done by hardware. The software techniques and hardware techniques each have performance limitations.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
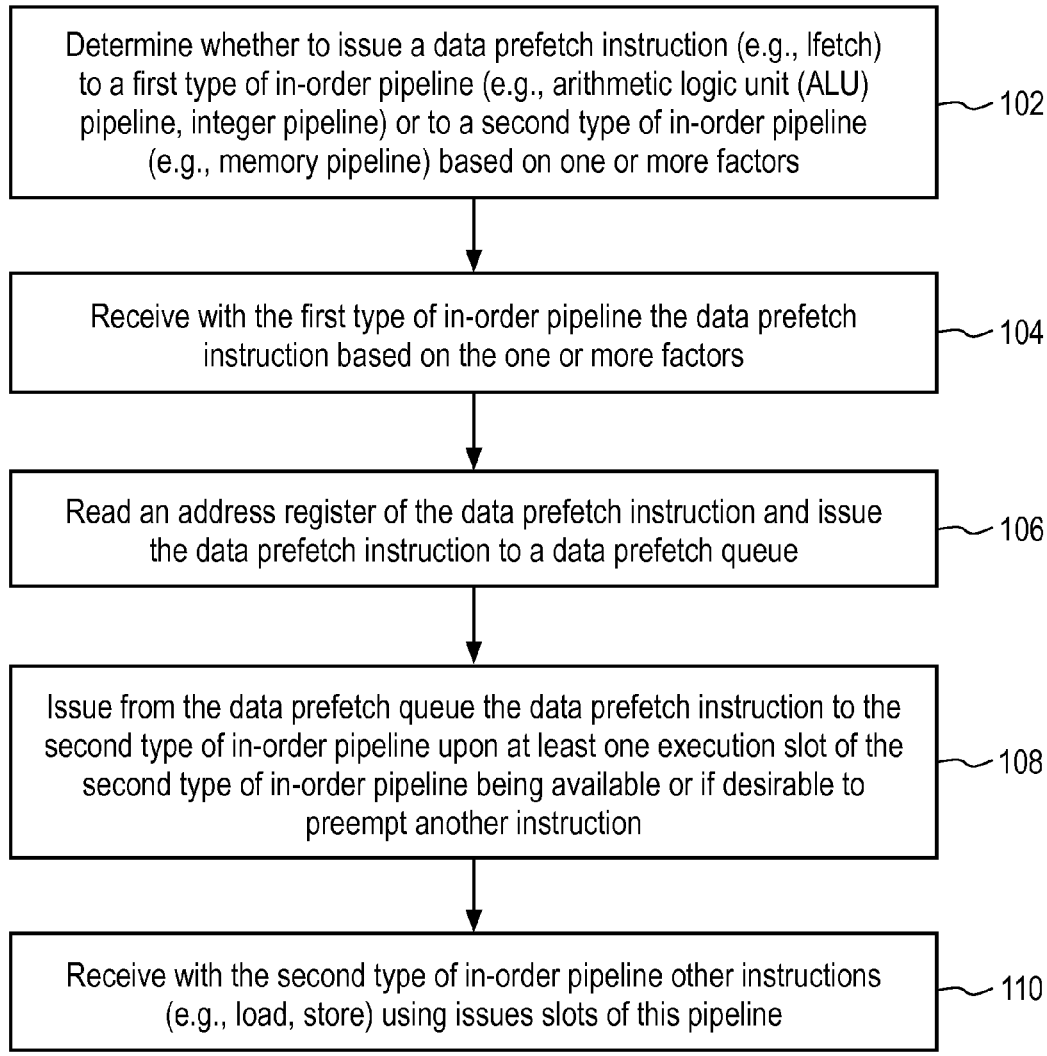
FIG. 1 illustrates a flow diagram of one embodiment for a computer-implemented method of providing out-of-order prefetch instructions of an in-order pipeline in accordance with one embodiment of the invention.

Apparatuses, systems, and a method for providing a processor architecture with out-of-order prefetch instructions for an in-order pipeline are described. In one embodiment, a system that includes hardware (e.g., data prefetch queue) and software data prefetching is implemented. In such a system, the features of the overall microarchitecture, the characteristics of the instruction set architecture, and the characteristics of the software base have implications on the design, selection, and synthesis of various data prefetching techniques and features.

In-order pipelines execute instructions in-order while out-of-order pipelines allow most instructions to execute out-of-order, including explicit data prefetch instructions. One disadvantage of an in-order pipeline is that resources that are needed for execution of a particular instruction but not immediately available can cause the pipeline (and thus that instruction and all following instructions) to stall and wait for the resources. These stalls can even be caused by explicit data prefetch instructions. One disadvantage of out-of-order pipelines is that the machinery required for full out-of-order execution is costly. Embodiments of this invention eliminate some of these stalls that can be triggered by explicit data prefetch instructions waiting on unavailable resources. The processor architecture for the in-order pipeline described herein is less costly than that required for out-of-order pipelines.

Embodiments of the invention provide the ability to postpone explicit data prefetch instructions that cannot execute yet due to some unavailable resources without stalling the following instructions. Thus, the following instructions actually execute out-or-order with respect to the data prefetches. This dispatching of data prefetches out of the main pipeline and into this data prefetch queue occurs after reading the addresses of the data prefetch instructions from their source registers. For example, an ALU pipeline may read the addresses of the data prefetch instructions prior to sending the data prefetch instructions to the data prefetch queue. The following instructions can continue to execute while the data prefetch waits in the data prefetch queue for the resources it needs to execute.

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that embodiments of the invention may be practiced without such specific details. In other instances, control structures and gate level circuits have not been shown in detail to avoid obscuring embodiments of the invention. Those of ordinary skill in the art, with the included descriptions, will be able to implement appropriate logic circuits without undue experimentation.

In the following description, certain terminology is used to describe features of embodiments of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a micro-controller, or the like. The interconnect between chips each could be point-to-point or each could be in a multi-drop arrangement, or some could be point-to-point while others are a multi-drop arrangement.

FIG. 1 illustrates a flow diagram of one embodiment for a computer-implemented method 100 of providing out-of-order prefetch instructions of an in-order pipeline in accordance with one embodiment. The method 100 is performed by processing logic that may comprise hardware (circuitry, dedicated logic, etc.), software (such as is run on a general purpose computer system or a dedicated machine or a device), or a combination of both. In one embodiment, the method 100 is performed by processing logic associated with the architecture discussed herein.

At block 102, the processing logic determines whether to issue a data prefetch instruction (e.g., lfetch) to a first type of in-order pipeline (e.g., arithmetic logic unit (ALU) pipeline, integer pipeline) or to a second type of in-order pipeline (e.g., memory pipeline) based on one or more factors (e.g., availability of one or more issue slots of the second type of in-order pipeline, priority of the data prefetch instruction). For example, it is possible, through certain instruction bundle encodings, for software to force an lfetch to go down the second type pipeline ahead of another instruction that needs to use the same pipeline. Lfetches may be a lowest priority or a higher priority. A software scheduler may make this determination. The available issue slots of the second type of in-order pipeline may be limited (e.g., 2 per clock cycle). At block 104, the first type of in-order pipeline receives the data prefetch instruction based on the one or more factors and the determination of the software scheduler. At block 106, the first type of in-order pipeline reads an address register of the data prefetch instruction and issues the data prefetch instruction to a data prefetch queue. At block 108, the data prefetch queue issues the data prefetch instruction to the second type of in-order pipeline upon at least one execution slot of the second type of in-order pipeline being available or by preempting another instruction that wants to use the second type of in-order pipeline. Another instruction may be preempted to avoid overflowing a capacity of the data prefetch queue and thus dropping a data prefetch instruction (e.g., lfetch). An lfetch can then be issued from the data prefetch queue to the second type of pipeline when the pipeline is stalled or replaying. The second type of in-order pipeline also receives other instructions (e.g., load, store) using issues slots of this pipeline at block 110.

In one embodiment, the first type of in-order pipeline is an arithmetic logic unit (ALU) pipeline to receive ALU instructions and data prefetch instructions and the second type of in-order pipeline is a memory pipeline.

Figure 2:
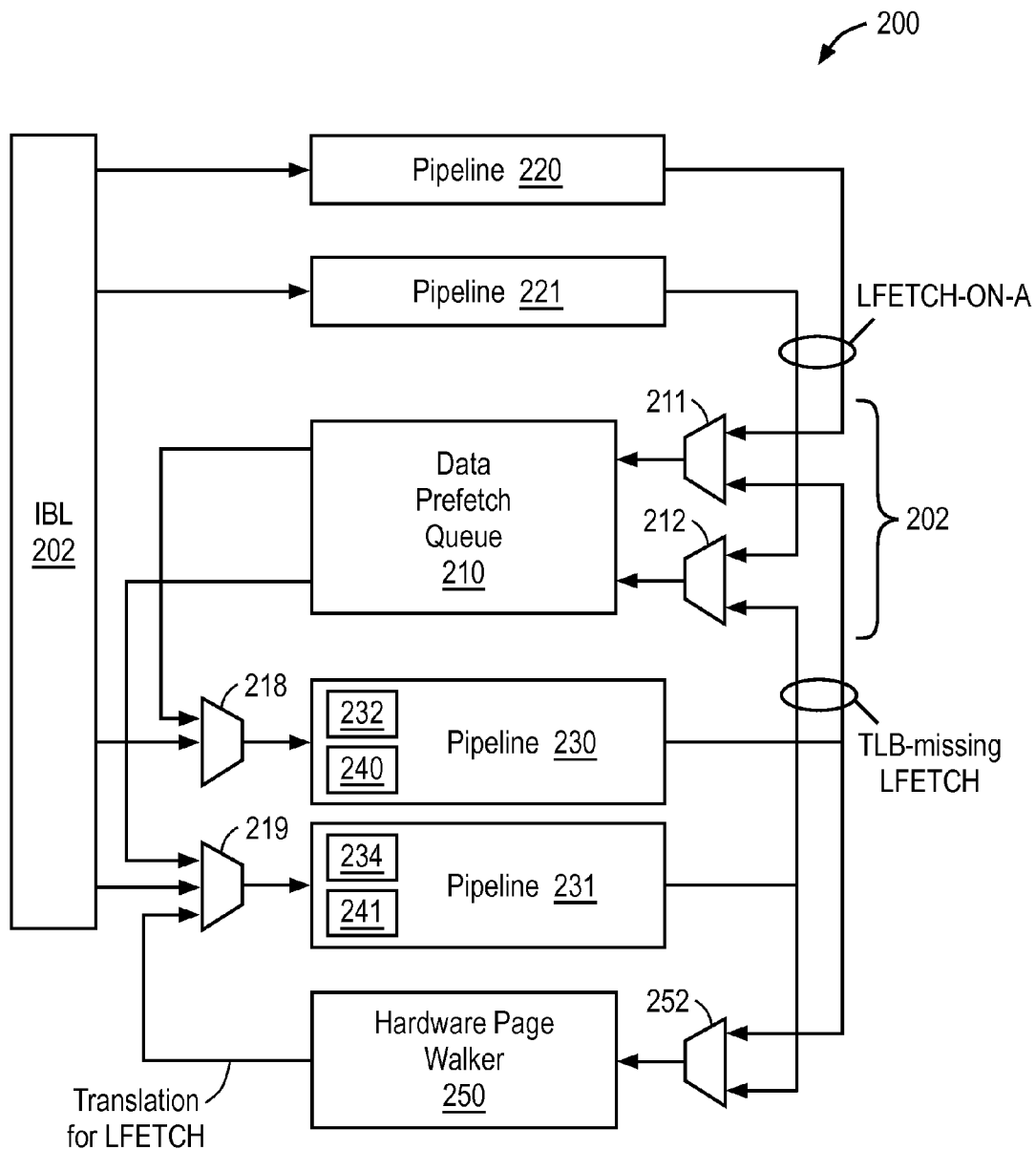
FIG. 2 illustrates a processor architecture in accordance with one embodiment of the invention.

FIG. 2 illustrates a block diagram of a processor architecture in accordance with one embodiment. The processor architecture 200 includes the in-order pipeline 220 and an optional in-order pipeline 221 to receive data prefetch instructions and other instructions. The in-order pipelines 220, 221 may be arithmetic logic unit (ALU) pipelines to receive ALU instructions and data prefetch instructions (e.g., lfetch-on-A). Alternatively, at least one of the pipelines 220, 221 may be an integer pipeline to receive integer instructions and data prefetch instructions. The individual pipelines 220 and 221 can act together to form a single multiple-instruction-wide in-order pipeline. In other words, instruction ordering is preserved across the pipelines as well as within the pipelines.

The processor architecture 200 further includes a second type of in-order pipelines 230, 231 have issues slots that may receive other instructions via multiplexers 218, 219. A slot refers to entries in a pipeline that can contain an operation. In an embodiment, the architecture includes at least one of the pipelines 230, 231. The processor architecture 200 includes a translation lookaside buffer (TLB) 240 with a number of ports for mapping virtual addresses to physical addresses. A port refers to an input of a large structure like an array that can accept an operation. The TLB 240 and TLB 241 may be located in the pipelines 230 and 231, respectively. A data prefetch queue 210 receives a data prefetch instruction when a respective virtual address associated with the data prefetch instruction is not found in the TLB 240 or 241 (e.g., TLB missing lfetch). A hardware page walker 250 accesses (e.g., "walks") page tables in memory by issuing special load instructions down a memory pipeline. The hardware page walks are initiated when data prefetch instructions are not found in the TLB 240 or 241. The hardware page walker receives hardware page walks via multiplexer 252 and includes some buffering so that it can handle multiple simultaneous hardware page walks without stalling the pipeline.

The data prefetch queue 210 issues data prefetch instructions to at least one of the second type of in-order pipelines 230, 231 upon at least one execution slot of these in-order pipelines being available or by preempting another instruction that wants to use the second type of in-order pipeline. The data prefetch instructions may be issued if no hardware page walks are outstanding. The present design does not always wait for no hardware page walks to be outstanding before issuing the data prefetch instructions. For example, in an embodiment, only data prefetches that were inserted into the data prefetch due to a TLB miss wait for no hardware page walks to be outstanding before the data prefetches issue. The hardware page walker 250 may have inserted a respective translation into a respective TLB for a respective data prefetch instruction or the hardware page walk may have failed. If the hardware page walks and the translation is not in the TLB the second time, then the data prefetch instruction is dropped. Multiple hardware page walks may be coalesced into a single page walk when multiple data prefetch instructions to the same page are not found in a respective TLB.

The second type of in-order pipelines can execute while multiple hardware page walks occur.

The processor architecture of the present design adds a number of data prefetching features (e.g., sending lfetch instructions to the first type of pipelines, a non-blocking lfetch as described below, etc.). A micro-architecture is created that enables all of these prefetching mechanisms with minimal cost and complexity and would easily enable the addition of other prefetching mechanisms as well.

Figure 3:
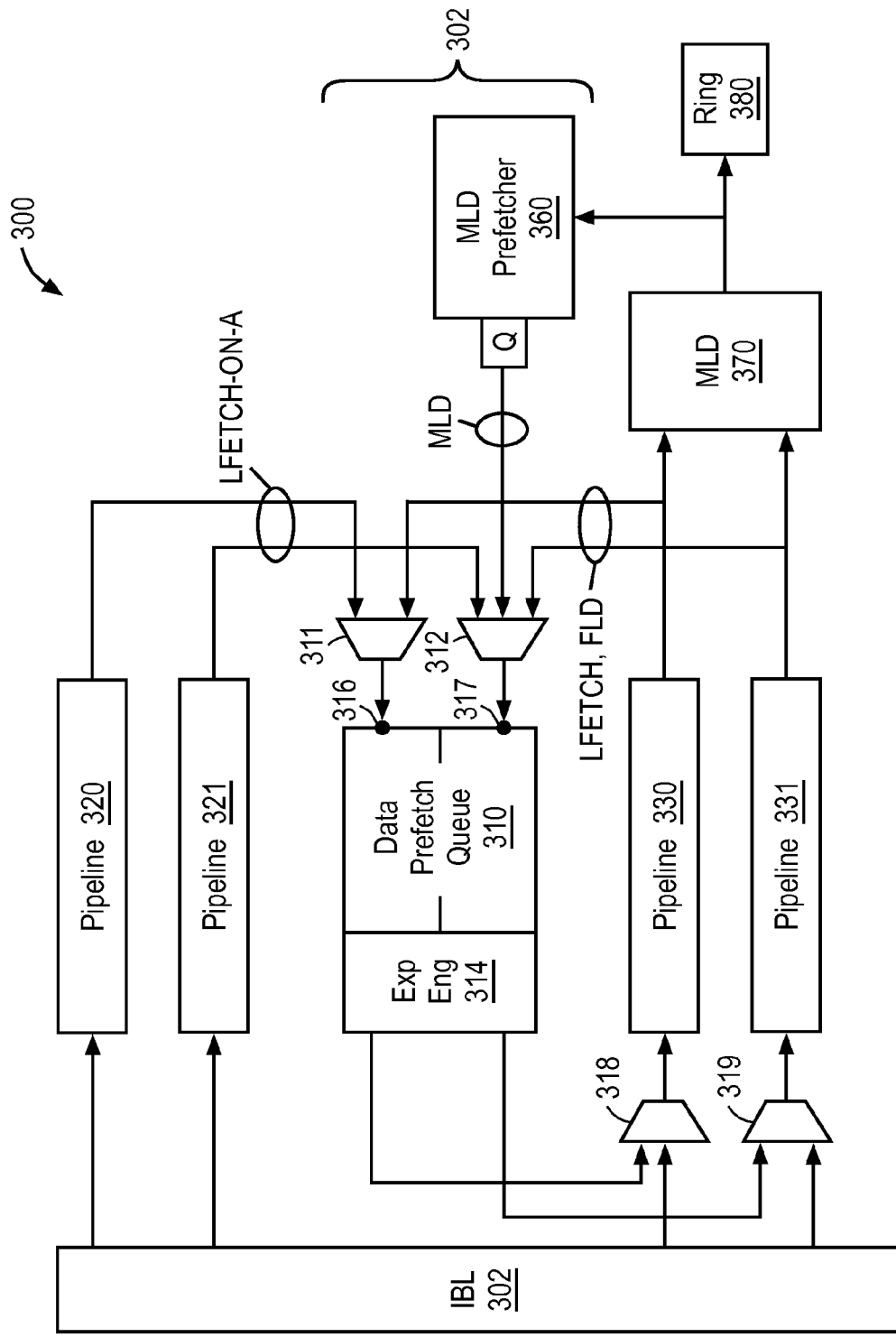
FIG. 3 illustrates a processor architecture in accordance with another embodiment of the invention.

FIG. 3 illustrates a processor architecture 300 with a data prefetch queue (DPQ) 310 in accordance with one embodiment. The DPQ 310 can be a first-in first-out (FIFO) structure which temporarily stores prefetches requested from some or all of the software and hardware prefetch sources described herein. This structure allows short bursts of prefetches to be accepted without back-pressuring the pipeline. FIG. 3 shows how the prefetching system 302, which includes DPQ 310, engine 314, MLD prefetcher 360, and multiplexers 311, 312, 318, and 319 connects to the existing pipelines 320, 321, 330, and 331, and how the data prefetch queue 310 is central to the prefetching system 302. Mid level data cache (MLD) 370 prefetches may arrive from the MLD prefetcher block 360. Lfetch instructions from the lfetch-on-A pipeline feature can arrive from one of the first type of pipelines 320, 321 (e.g., A-pipes). Prefetches associated with the non-blocking data TLB or first level data cache (FLD) hardware prefetching features may arrive from one of the second type of pipelines 330, 331 (e.g., M-pipes). The DPQ then inserts prefetches into either M-pipe on a cycle in which the main pipe Instruction Buffer Logic (IBL) 302 is not issuing instructions into the same M-pipe. Sometimes, in order to avoid dropping lfetch instructions, the DPQ takes priority over other M-pipe instructions waiting to be issued from the main pipe instruction buffer.

In one embodiment, the DPQ is an 8-entry FIFO. Each prefetch request occupies just a single entry in the DPQ, even if it will be ultimately expanded into several individual prefetches. When a prefetch request reaches the head of its FIFO, it is moved into an expansion engine (EE) 314. The EE 214 expands a prefetch request from the DPQ into a group of individual prefetches, and then sequentially injects those individual prefetches into the M-pipes. The EE also allows individual prefetches to cross over and be issued into the opposite M-pipe, to make the most efficient use of unused pipeline slots. The DPQ may have two write ports as illustrated in FIG. 3. The first port 316 can take writes from the pipeline 330 or pipeline 320, and the second port 317 can take writes from the pipeline 331 or pipeline 321, or the MLD prefetcher. The DPQ can accept one prefetch request per port per cycle. An lfetch on an A-port should be inserted into the DPQ. An lfetch on an M-port might need to be inserted into the DPQ if it misses the data TLB. If there are two simultaneous DPQ insertion requests on a single port of the DPQ, only the insertion from the A-port occurs. The MLD hardware prefetch block 360 includes a small FIFO queue (Q) on its output allowing its requests to be buffered and inserted into the DPQ later, if they happen to conflict with other prefetch requests. Within the DPQ all types of prefetches are kept in order, but lfetch instructions are given higher importance than prefetches initiated by the hardware. For example, if an lfetch has been waiting for too long in the expansion engine without finding an unused pipeline slot to use, it may trigger a pipeline bubble to force an empty slot to be created. However, if a hardware prefetch is waiting for too long, it may be dropped. Also, if the DPQ begins to fill up, waiting hardware prefetches may be deleted to make more room for a newer lfetch. The DPQ provides an efficient, centralized, shared resource that can handle prefetches from a variety of sources.

Figure 4:
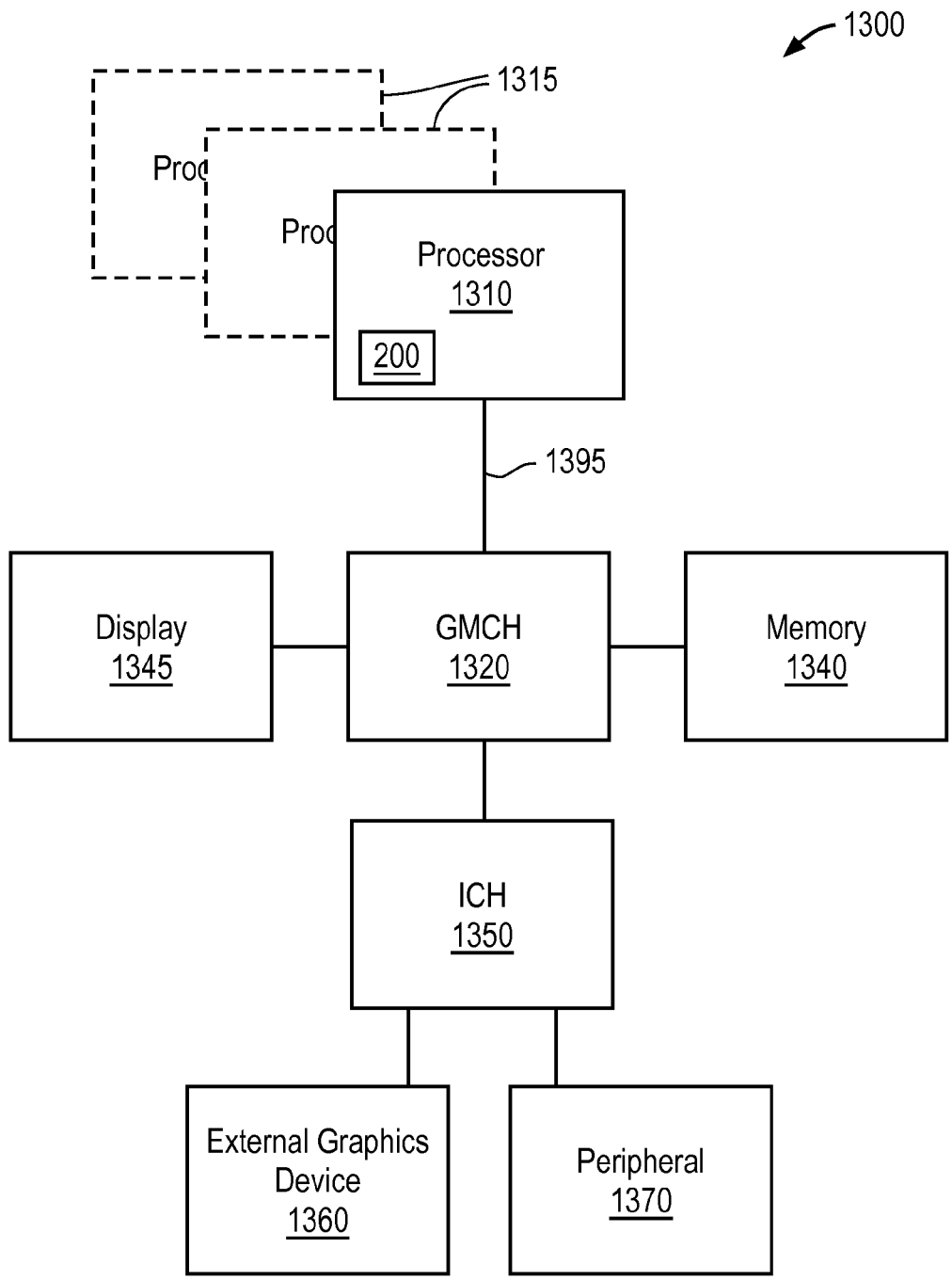
FIG. 4 is a block diagram of a system in accordance with one embodiment of the invention.

FIG. 4 illustrates a block diagram of a system 1300 in accordance with one embodiment. The system 1300 may include one or more processors 1310, 1315, which are coupled to graphics memory controller hub (GMCH) 1320. The optional nature of additional processors 1315 is denoted in FIG. 4 with broken lines. The one or more processors 1310, 1315 include in part a processor architecture (e.g., 200, 300) as discussed above. In an embodiment, the architecture includes a first type of in-order pipeline 220 and optionally a second pipeline 221. These pipelines (e.g., ALU pipelines) may receive ALU instructions and data prefetch instructions. The pipelines receive at least one data prefetch instruction from instruction buffer logic (IBL) 202. The second type of in-order pipelines 230, 231 (e.g., memory pipelines) have issues slots and execution slots. Other instructions are received with issues slots from the IB 202. The data prefetch queue 210 receives the at least one data prefetch instruction from one or both of the pipelines 220, 221. The data prefetch queue 210 issues the at least one data prefetch instruction to at least one of the second type of in-order pipelines 230, 231 upon at least one execution slot of the pipelines 230, 231 being available. The system further includes one or more execution units 232, 234 to execute instructions associated with the execution slots of the second type of in-order pipelines 230, 231. The execution units may be located in the in-order pipelines 230 and 231 or associated with the pipelines 230 and 231. A software scheduler determines whether to send the at least one data prefetch instruction to the first type of in-order pipelines (e.g., 220, 221) or to the second type of in-order pipelines based on availability of one or more issue slots of the second type of in-order pipelines (e.g., 230, 231). In an embodiment, the first type of in-order pipelines are integer pipelines to receive integer instructions and data prefetch instructions. The system 1300 further includes memory 1340 coupled to the one or more processing units. The one or more execution units of the second type of in-order pipelines send data associated with the executed instructions to the memory.

FIG. 4 illustrates that the GMCH 1320 may be coupled to the memory 1340 that may be, for example, a dynamic random access memory (DRAM). The DRAM may, for at least one embodiment, be associated with a non-volatile cache.

The GMCH 1320 may be a chipset, or a portion of a chipset. The GMCH 1320 may communicate with the processor(s) 1310, 1315 and control interaction between the processor(s) 1310, 1315 and memory 1340. The GMCH 1320 may also act as an accelerated bus interface between the processor(s) 1310, 1315 and other elements of the system 1300. For at least one embodiment, the GMCH 1320 communicates with the processor(s) 1310, 1315 via a multi-drop bus, such as a frontside bus (FSB) 1395.

Furthermore, GMCH 1320 is coupled to a display 1345 (such as a flat panel display). GMCH 1320 may include an integrated graphics accelerator. GMCH 1320 is further coupled to an input/output (I/O) controller hub (ICH) 1350, which may be used to couple various peripheral devices to system 1300. Shown for example in the embodiment of FIG. 4 is an external graphics device 1360, which may be a discrete graphics device coupled to ICH 1350, along with another peripheral device 1370.

Alternatively, additional or different processors may also be present in the system 1300. For example, additional processor(s) 1315 may include additional processors(s) that are the same as processor 1310, additional processor(s) that are heterogeneous or asymmetric to processor 1310, accelerators (such as, e.g., graphics accelerators or digital signal processing (DSP) units), field programmable gate arrays, or any other processor. There can be a variety of differences between the physical resources 1310, 1315 in terms of a spectrum of metrics of merit including architectural, micro-architectural, thermal, power consumption characteristics, and the like. These differences may effectively manifest themselves as asymmetry and heterogeneity amongst the processing elements 1310, 1315. For at least one embodiment, the various processing elements 1310, 1315 may reside in the same die package. The software (e.g., software scheduler) may also reside, completely or at least partially, within the processing element(s) 1310, 1315 during execution thereof by the processing element(s) 1310, 1315. The processing element(s) 1310, 1315 also constituting machine-accessible storage media and processor architecture 200.

Figure 5:
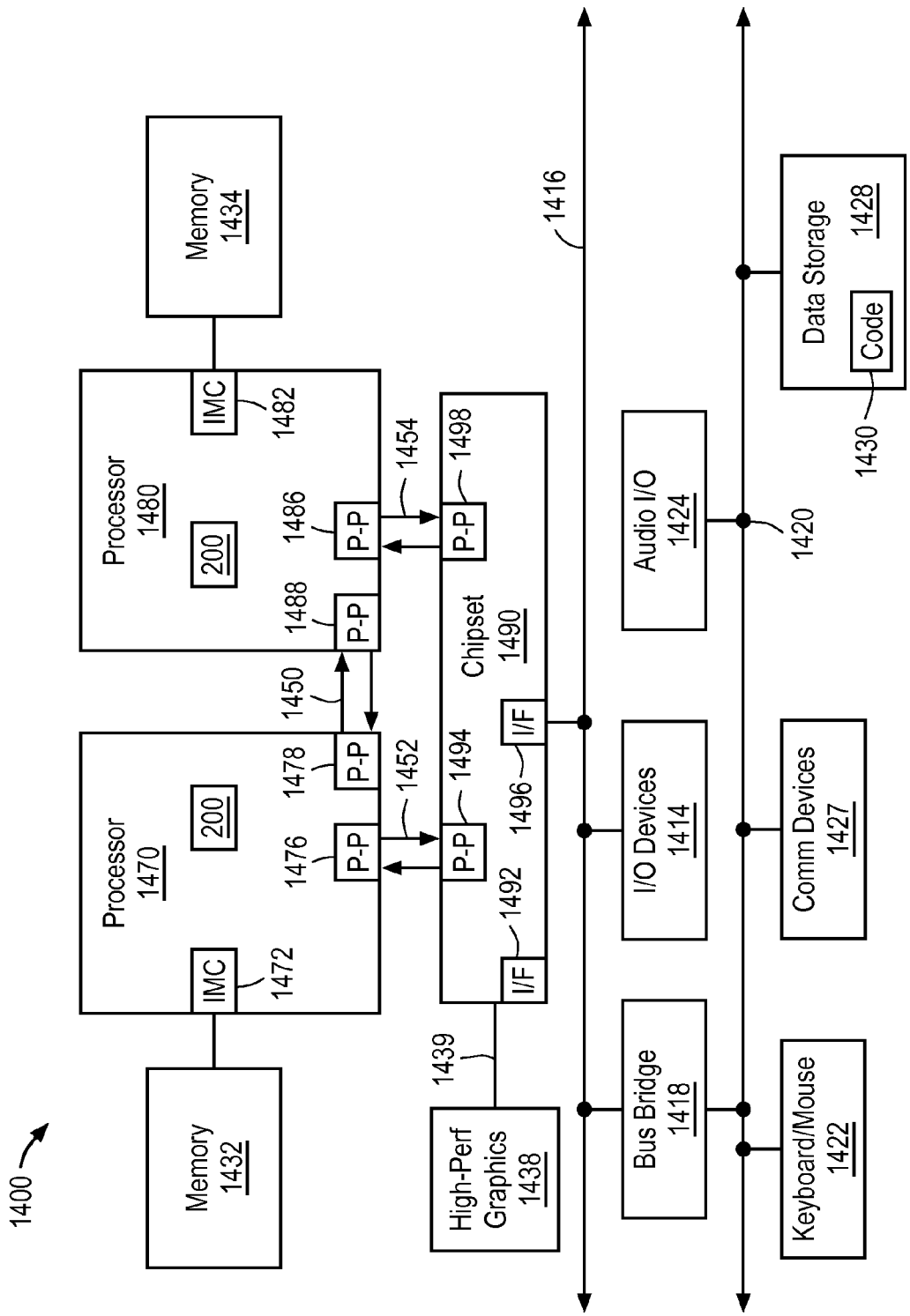
FIG. 5 is a block diagram of a second system in accordance with an embodiment of the invention.

Referring now to FIG. 5, shown is a block diagram of a second system 1400 in accordance with an embodiment of the present invention. As shown in FIG. 5, multiprocessor system 1400 is a point-to-point interconnect system, and includes a first processor 1470 and a second processor 1480 coupled via a point-to-point interconnect 1450. As shown in FIG. 5, each of processors 1470 and 1480 includes the processor architecture (e.g., 200, 300) described herein. Software (e.g., software scheduler) may also reside, completely or at least partially, within the processors during execution thereof by the processors. The processors also constituting machine-accessible storage media. Alternatively, one or more of processors 1470, 1480 may be an element other than a processor, such as an accelerator or a field programmable gate array. While shown with only two processors 1470, 1480, it is to be understood that the scope of embodiments of the present invention is not so limited. In other embodiments, one or more additional processing elements may be present in a given processor.

Processor 1470 may further include an integrated memory controller hub (IMC) 1472 and point-to-point (P-P) interfaces 1476 and 1478. Similarly, second processor 1480 may include a IMC 1482 and P-P interfaces 1486 and 1488. Processors 1470, 1480 may exchange data via a point-to-point (PtP) interface 1450 using PtP interface circuits 1478, 1488. As shown in FIG. 5, IMC's 1472 and 1482 couple the processors to respective memories, namely a memory 1442 and a memory 1444, which may be portions of main memory locally attached to the respective processors.

Processors 1470, 1480 may each exchange data with a chipset 1490 via individual P-P interfaces 1452, 1454 using point to point interface circuits 1476, 1494, 1486, 1498. Chipset 1490 may also exchange data with a high-performance graphics circuit 1438 via a high-performance graphics interface 1439.

A shared cache (not shown) may be included in either processor outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of embodiments of the present invention is not so limited.

As shown in FIG. 5, various I/O devices 1414 may be coupled to first bus 1416, along with a bus bridge 1418 which couples first bus 1416 to a second bus 1420. In one embodiment, second bus 1420 may be a low pin count (LPC) bus. Various devices may be coupled to second bus 1420 including, for example, a keyboard/mouse 1422, communication devices 1426 and a data storage unit 1428 such as a disk drive or other mass storage device which may include code 1430, in one embodiment. Further, an audio I/O 1424 may be coupled to second bus 1420. Note that other architectures are possible. For example, instead of the point-to-point architecture of FIG. 5, a system may implement a multi-drop bus or other such architecture.

Figure 6:
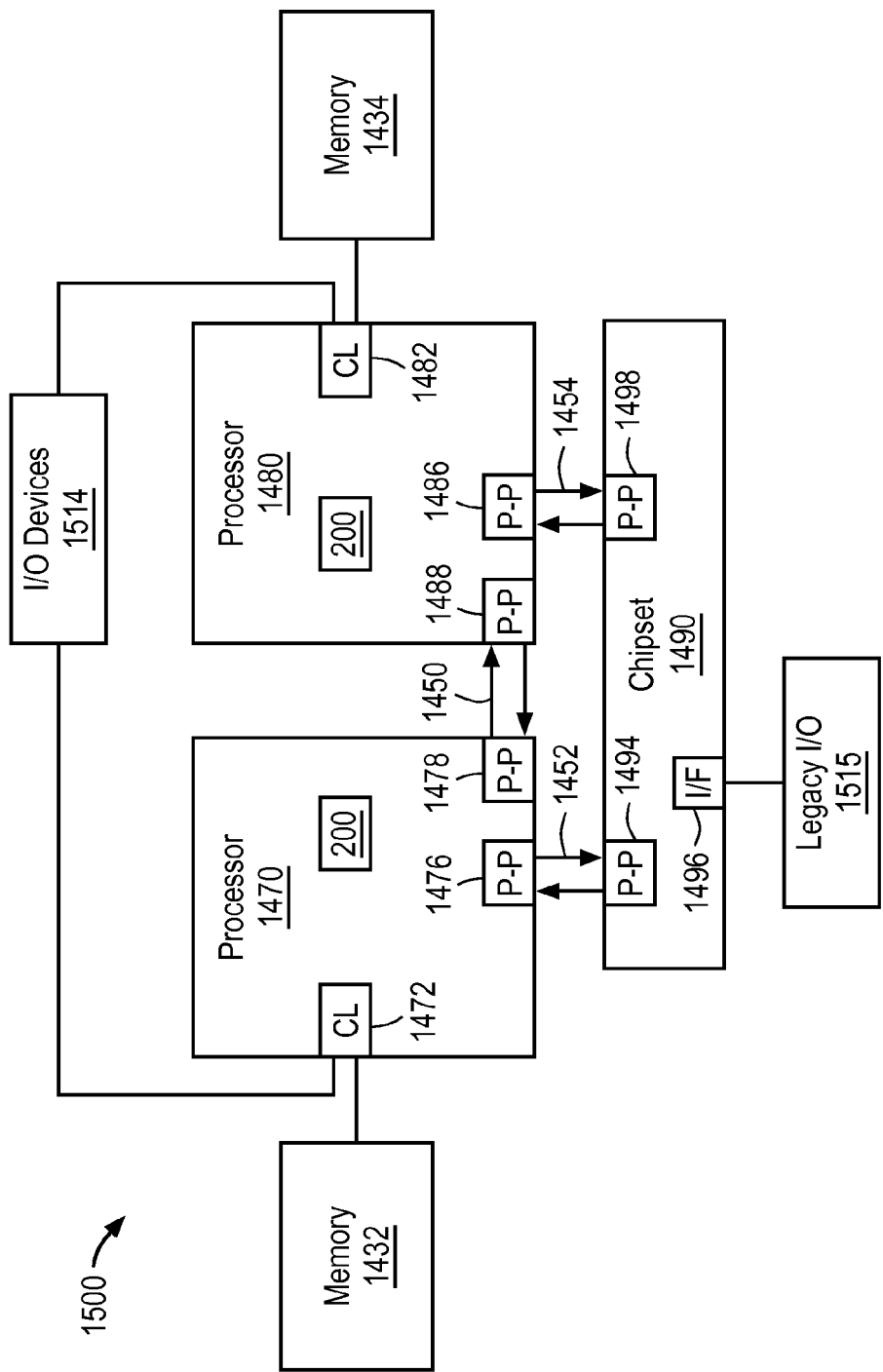
FIG. 6 is a block diagram of a third system in accordance with an embodiment of the invention.

Referring now to FIG. 6, shown is a block diagram of a third system 1500 in accordance with an embodiment of the present invention. Like elements in FIGS. 5 and 6 bear like reference numerals, and certain aspects of FIG. 6 have been omitted from FIG. 6 in order to avoid obscuring other aspects of FIG. 6.

FIG. 6 illustrates that the processing elements 1470, 1480 may include the processor architecture (e.g., 200, 300), integrated memory and I/O control logic ("CL") 1472 and 1482, respectively. For at least one embodiment, the CL 1472, 1482 may include memory controller hub logic (IMC) such as that described above in connection with FIGS. 4 and 5. In addition, CL 1472, 1482 may also include I/O control logic. FIG. 6 illustrates that not only are the memories 1442, 1444 coupled to the CL 1472, 1482, but also that I/O devices 1514 are also coupled to the control logic 1472, 1482. Legacy I/O devices 1515 are coupled to the chipset 1490.

Figure 7:
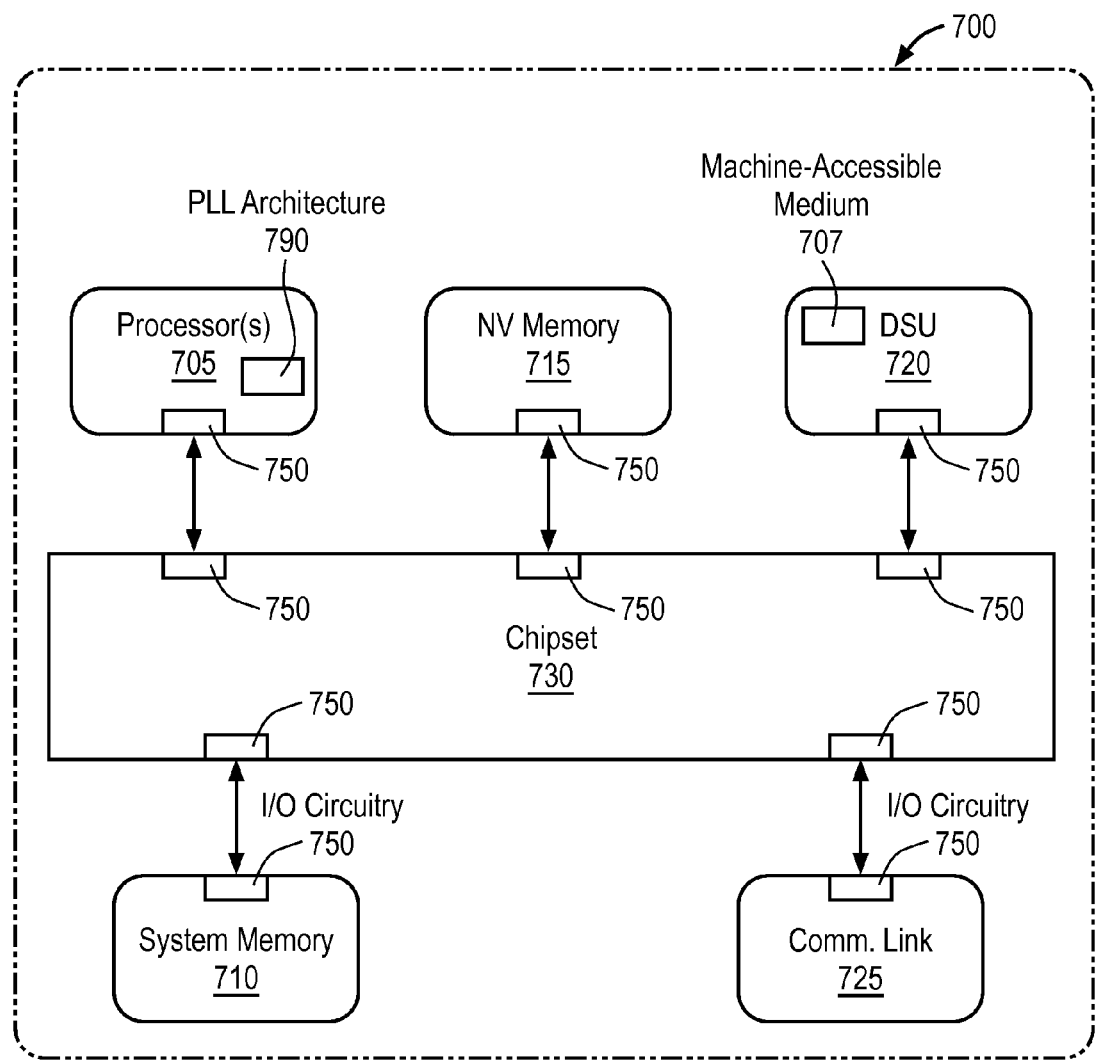
FIG. 7 illustrates a functional block diagram illustrating a system implemented in accordance with one embodiment of the invention.

FIG. 7 illustrates a functional block diagram illustrating a system 700 implemented in accordance with one embodiment. The illustrated embodiment of processing system 700 includes one or more processors (or central processing units) 705 having processor architecture 790 (e.g., processor architecture 200, processor architecture 300), system memory 710, nonvolatile ("NV") memory 715, a data storage unit ("DSU") 720, a communication link 725, and a chipset 730. The illustrated processing system 700 may represent any computing system including a desktop computer, a notebook computer, a workstation, a handheld computer, a server, a blade server, or the like.

The elements of processing system 700 are interconnected as follows. Processor(s) 705 is communicatively coupled to system memory 710, NV memory 715, DSU 720, and communication link 725, via chipset 730 to send and to receive instructions or data thereto/therefrom. In one embodiment, NV memory 715 is a flash memory device. In other embodiments, NV memory 715 includes any one of read only memory ("ROM"), programmable ROM, erasable programmable ROM, electrically erasable programmable ROM, or the like. In one embodiment, system memory 710 includes random access memory ("RAM"), such as dynamic RAM ("DRAM"), synchronous DRAM, ("SDRAM"), double data rate SDRAM ("DDR SDRAM"), static RAM ("SRAM"), and the like. DSU 720 represents any storage device for software data, applications, and/or operating systems, but will most typically be a nonvolatile storage device. DSU 720 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 720 is illustrated as internal to processing system 700, DSU 720 may be externally coupled to processing system 700. Communication link 725 may couple processing system 700 to a network such that processing system 700 may communicate over the network with one or more other computers. Communication link 725 may include a modem, an Ethernet card, a Gigabit Ethernet card, Universal Serial Bus ("USB") port, a wireless network interface card, a fiber optic interface, or the like.

The DSU 720 may include a machine-accessible medium 707 on which is stored one or more sets of instructions (e.g., software) embodying any one or more of the methods or functions described herein. The software (e.g., software scheduler) may also reside, completely or at least partially, within the processor(s) 705 during execution thereof by the processor(s) 705, the processor(s) 705 also constituting machine-accessible storage media.

While the machine-accessible medium 707 is shown in an exemplary embodiment to be a single medium, the term "machine-accessible medium" should be taken to include a single medium or multiple media (e.g., a centralized or distributed database, and/or associated caches and servers) that store the one or more sets of instructions. The term "machine-accessible medium" shall also be taken to include any medium that is capable of storing, encoding or carrying a set of instructions for execution by the machine and that cause the machine to perform any one or more of the methodologies of embodiments of the present invention. The term "machine-accessible medium" shall accordingly be taken to include, but not be limited to, solid-state memories, optical, and magnetic media.

Thus, a machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

As illustrated in FIG. 7, each of the subcomponents of processing system 700 includes input/output ("I/O") circuitry 750 for communication with each other. I/O circuitry 750 may include impedance matching circuitry that may be adjusted to achieve a desired input impedance thereby reducing signal reflections and interference between the subcomponents. In one embodiment, the PLL architecture 700 (e.g., PLL architecture 100) may be included within various digital systems. For example, the PLL architecture 790 may be included within the processor(s) 705 and/or communicatively coupled to the processor(s) to provide a flexible clock source. The clock source may be provided to state elements for the processors(s) 705.

It should be appreciated that various other elements of processing system 700 have been excluded from FIG. 7 and this discussion for the purposes of clarity. For example, processing system 700 may further include a graphics card, additional DSUs, other persistent data storage devices, and the like. Chipset 730 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 730. Correspondingly, processing system 700 may operate without one or more of the elements illustrated. For example, processing system 700 need not include DSU 720.

The processor design described herein includes an aggressive new microarchitecture design. In a specific embodiment, this design contains 8 multi-threaded cores on a single piece of silicon and can issue up to 12 instructions to the execution pipelines per cycle. The 12 pipelines may include 2 M-pipes (Memory), 2 A-pipes (ALU), 2 I-pipes (Integer), 2 F-pipes (Floating-point), 3 B-pipes (Branch), and 1 N-pipe (NOP). The number of M-pipes is reduced to 2 from 4 on previous Itanium® processors. As with previous Itanium® processor designs, instructions are issued and retired in order. Memory operations detect any faults before retirement, but they can retire before completion of the memory operation. Instructions that use load target registers delay their execution until the completion of the load. Memory instructions that use the memory results of a store can retire before the store is complete. The cache hierarchy guarantees that such memory operations will complete in the proper order.

The data cache hierarchy may be composed of the following cache levels:
16 KB First Level Data cache (FLD—core private)
256 KB Mid Level Data cache (MLD—core private)
32 MB Last Level instruction and data Cache (LLC—shared across all 8 cores)

The LLC is inclusive of all other caches. All 8 cores may share the LLC. The MLD and FLD are private to a single core. The threads on a particular core share all of the levels of cache. All of the data caches may have 64-byte cache lines. MLD misses typically trigger fetches for the two 64-byte lines that make up an aligned 128-byte block in order to emulate the performance of the 128-byte cache lines of previous Itanium® processors. This last feature is referred to as MLD buddy line prefetching the processor architecture (e.g., Itanium® architecture) that defines an lfetch instruction which software can use to prefetch data into various cache levels with or without faulting on bad addresses. This lfetch instruction has no required architectural order with respect to other memory operations.

Software that runs on the processor design described herein will be much more likely to contain software data prefetching than would be the case in other architectures because of the Itanium® architecture's support for and focus on software optimization including software data prefetching. This software data prefetching has been quite successful at boosting performance. In one embodiment, an exemplary software to run on the present processor design will be large enterprise class applications. These applications tend to have large cache and memory footprints and high memory bandwidth needs. Data prefetching, like all forms of speculation, can cause performance loss when the speculation is incorrect. Because of this, minimizing the number of useless data prefetches (data prefetches that don't eliminate a cache miss) is important. Data prefetches consume limited bandwidth into, out of, and between the various levels of the memory hierarchy. Data prefetches displace other lines from caches. Useless data prefetches consume these resources without any benefit and to the detriment of potentially better uses of such resources. In a multi-threaded, multi-core processor as described herein, shared resources like communication links and caches can be very heavily utilized by non-speculative accesses. Large enterprise applications tend to stress these shared resources. In such a system, it is critical to limit the number of useless prefetches to avoid wasting a resource that could have been used by a non-speculative access. Interestingly, software data prefetching techniques tend to produce fewer useless prefetches than many hardware data prefetching techniques. However, due to the dynamic nature of their inputs, hardware data prefetching techniques are capable of generating useful data prefetches that software sometimes can not identify. Software and hardware data prefetching have a variety of other complementary strengths and weaknesses. The present processor design makes software prefetching more effective, adds conservative, highly accurate hardware data prefetching that complements and doesn't hurt software data prefetching, achieves robust performance gains with mean widespread gains with no major losses and few minor losses, and minimizes the design resources required.

A number of features of the present process design improve the effectiveness of software data prefetching. These features are referred to as lfetch-on-A and non-blocking lfetch. Hardware data prefetching features include MLD hardware prefetching and FLD hardware prefetching. A micro-architectural feature of the present processor design is the Data Prefetch Queue (DPQ) that is a shared resource involved in executing the data prefetches associated with all of the features described herein. Software code running on processors (e.g., Itanium® processors) can be scheduled with knowledge of the types and numbers of execution units available each cycle to execute instructions. On previous Itanium® processors, lfetch instructions have executed on M-pipes along with all other memory operations such as loads and stores. In one embodiment, software can use a maximum of 2 M-pipe issue slots per cycle as described herein. The need to use an M-pipe issue slot, then, is an important cost associated with an lfetch. Interestingly, although issue slots on M-pipes can be scarce, the M-pipes execution slots are unused for a significant fraction of cycles due to stalls or replays in the present design's pipeline. This idle bandwidth is unavailable to software because by definition, in an in-order pipeline, a stall or replay of one instruction stalls or replays all following instructions. In addition to the two M-pipes, the present processor architecture may also have two A-pipes and two I-pipes. A-pipes are much less valuable and much more likely to be available than M-pipes because the ALU instructions that can be executed by an A-pipe can also be executed by an I-pipe or an M-pipe. As mentioned previously, an lfetch is allowed to execute in any order with respect to other memory operations. Therefore, the non-faulting flavor of lfetch only needs to access its registers in-order with respect to other instructions. The memory access portion of the lfetch can be postponed.

In an effort to reduce the cost of issuing lfetch instructions, the present design allows an lfetch to issue to an A-pipe or an M-pipe. When an lfetch is issued down an A-pipe, it simply reads its address register and is placed into the DPQ. An lfetch can then be issued from the DPQ to an M-pipe when the pipeline is stalled or replaying. An lfetch instruction that is issued to an A-pipe does have longer latency (e.g., +7 cycles minimum), but it requires only the use of an M-pipe execution slot and not an M-pipe instruction issue slot. Software schedulers can control which pipeline an lfetch goes down, so this feature gives software the ability to trade lfetch latency for M-pipe issue bandwidth.

Processors (e.g, Itanium® processors) may have a hardware page walker that can look up translations in the virtual hash page table (VHPT) in memory and insert them into the TLBs. On previous Itanium® processors, when an lfetch missed the data TLB and initiated a hardware page walk, the pipeline was stalled for the duration of the hardware page walk. The problem with this approach is that a useless lfetch can stall the pipeline for a long time. Since an lfetch instruction is inherently speculative, it can uselessly attempt to reference a page which would never be referenced by a non-speculative instruction. One example of such a situation is when an lfetch instruction is used in a loop to prefetch data that might be needed in a later iteration of the loop. In this case, when the loop exits, a number of useless lfetch instructions will have already been issued. Such an instruction could easily cause a useless hardware page walk and the associated long latency pipeline stall. It is worth noting that always dropping an lfetch instruction that misses the data TLB is also not a good option because sometimes the prefetch is needed. An example of such a situation is a loop that accesses data from a large address space. Such a loop could need to initiate quite a number of hardware page walks. If lfetch instructions are dropped when they miss the data TLB, then many useful prefetches could be lost.

To address this issue and make software data prefetching more effective, the present design makes use of the fact that most lfetch instructions are of the non-faulting type and that such lfetches can be executed out-of-order with respect to all other instructions. First, the present design extends the capabilities of the hardware page walker to enable it to handle multiple hardware page walks in flight simultaneously. Second, the present design uses the DPQ to queue up lfetch instructions that miss the data TLB. Therefore, in the present design, an lfetch that misses the data TLB can initiate a hardware page walk and then be placed in the DPQ to be re-issued after the hardware page walk has inserted a translation in the TLB. When multiple lfetch instructions to the same page miss the data TLB, the multiple potential hardware page walks are coalesced into a single walk, and all of the lfetch instructions are placed in the DPQ. If the DPQ fills up with lfetch instructions, it will stall the main pipeline to avoid dropping an lfetch. This technique is similar to the technique of making caches non-blocking. As with non-blocking caches, non-blocking TLB accesses become blocking accesses when queue entries are exhausted.

The MLD hardware prefetcher is a sequential prefetcher that moves lines into the MLD from higher levels of cache or memory. It tracks the spatial locality of mid-level data cache misses and potentially requests additional lines in the vicinity of the trigger miss. The prefetcher tracks up to 8 miss address streams on a 4K page basis by watching accesses that the MLD sends to the Ring 380, the interface to the LLC cache, as illustrated in FIG. 3. For each address stream, it records the most recent miss address as well as the current prefetch direction and depth. For each miss that is within a 5 cache lines of the previous miss, the prefetcher first issues the corresponding number of sequential prefetches in the forward or backward direction as recorded in the prefetch depth field of the corresponding history entry. It then increases the prefetch depth for that address stream up to 4 cache lines. In essence, this prefetch algorithm dynamically adjusts the effective line size of the mid-level data cache depending on the observed spatial locality of the cache misses. To reduce the potentially negative impact of hardware-initiated prefetching, the MLD prefetcher only responds to demand load misses as triggers. Software initiated prefetches (lfetch), store misses, and hardware initiated prefetches are ignored. Furthermore, MLD prefetch requests fill the mid-level data cache in the not-recently used state. Useless prefetches thus have a higher likelihood of being evicted ahead of other lines in the same set, while a useful prefetch will be marked most-recently used on the first demand access to the line.

It should be appreciated that reference throughout this specification to "one embodiment" or "an embodiment" means that a particular feature, structure or characteristic described in connection with the embodiment is included in at least one embodiment. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived there from, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

What is claimed is:

1. A computer-implemented method, comprising:
   determining to issue a data prefetch instruction to a data prefetch queue or to a second in-order pipeline based on availability of one or more issue slots of the second in-order pipeline;
   receiving the data prefetch instruction with the first in-order pipeline based on one or more factors;
   issuing the data prefetch instruction to a data prefetch queue; and
   issuing the data prefetch instruction to the second in-order pipeline upon at least one execution slot of the second in-order pipeline being available.

2. The computer-implemented method of claim 1, wherein the first type of in-order pipeline is an arithmetic logic unit (ALU) pipeline to receive ALU instructions and data prefetch instructions, wherein the second in-order pipeline is a memory pipeline.

3. The computer-implemented method of claim 1, further comprising:
receiving a plurality of other instructions with issues slots of the second in-order pipeline, wherein the one or more factors include at least one of no availability of one or more issue slots of the second in-order pipeline and priority of the data prefetch instruction.

4. A processor, comprising:
at least one of a first type of in-order pipeline to receive data prefetch instructions and other instructions;
at least one of a second type of in-order pipeline having issues slots to receive a plurality of other instructions;
a translation lookaside buffer (TLB) with a number of ports to map virtual addresses to physical addresses;
a data prefetch queue to receive data prefetch instructions when a respective virtual address associated with a respective data prefetch instruction is not found in the TLB; and
a hardware page walker to access page tables in memory when respective data prefetch instructions are not found in the TLB.

5. The processor of claim 4, wherein the at least one of the first type of in-order pipeline is an arithmetic logic unit (ALU) pipeline to receive ALU instructions and data prefetch instructions.

6. The processor of claim 4, wherein the data prefetch queue to issue data prefetch instructions to the at least one of the second type of in-order pipeline upon at least one execution slot of the at least one of the second type of in-order pipeline being available.

7. The processor of claim 4, wherein multiple hardware page walks are coalesced into a single page walk when multiple instructions concurrently request the same translation from the hardware page walker.

8. The processor of claim 4, wherein the at least one of the first type of in-order pipeline is an integer pipeline to receive integer instructions and data prefetch instructions.

9. The processor of claim 4, wherein the at least one of the second type of in-order pipeline to execute while multiple hardware page walks occur.

10. A system, comprising:
one or more processing units, comprising,
a first type of in-order pipeline to receive at least one data prefetch instruction;
at least one of a second type of in-order pipeline having issues slots to receive a plurality of instructions; and
a data prefetch queue to receive the at least one data prefetch instruction when a translation lookaside buffer does not have an entry associated with the virtual address of the data prefetch instruction and to issue the at least one data prefetch instruction to at least one of the second type of in-order pipeline upon at least one execution slot of the at least one of the second type of in-order pipeline being available.

11. The system of claim 10, further comprising:
an additional first type of in-order pipeline, wherein the first type of in-order pipelines are arithmetic logic unit (ALU) pipelines to receive ALU instructions and data prefetch instructions.

12. The system of claim 10, wherein the at least one of the second type of in-order pipeline comprises memory pipelines.

13. The system of claim 12, further comprising:
one or more execution units to execute instructions associated with the execution slots of the memory pipelines.

14. The system of claim 13, further comprising:
a software scheduler to determine whether to send the at least one data prefetch instruction to the first type of in-order pipelines or to the second type of in-order pipelines based on one or more factors including at least one of availability of one or more issue slots of the second type of in-order pipelines and priority of the at least one data prefetch instruction.

15. The system of claim 13, wherein the first type of in-order pipelines are integer pipelines to receive integer instructions and data prefetch instructions.

16. The system of claim 13, further comprising:
memory coupled to the one or more processing units, wherein the one or more execution units of the memory pipelines to send data associated with the executed instructions to the memory.

17. A non-transitory machine-accessible medium including data that, when accessed by a machine, cause the machine to perform operations comprising:
determining to issue a data prefetch instruction to a data prefetch queue or to a second in-order pipeline based on availability of one or more issue slots of the second in-order pipeline;
receiving the data prefetch instruction with the first in-order pipeline based on one or more factors;
issuing the data prefetch instruction to a data prefetch queue; and
issuing the data prefetch instruction to the second in-order pipeline upon at least one execution slot of the second in-order pipeline being available.

18. The non-transitory machine-accessible medium of claim 17, wherein the first type of in-order pipeline is an arithmetic logic unit (ALU) pipeline to receive ALU instructions and data prefetch instructions, wherein the second in-order pipeline is a memory pipeline.

19. The non-transitory machine-accessible medium of claim 17, further comprising:
receiving a plurality of other instructions with issues slots of the second in-order pipeline, wherein the one or more factors include at least one of no availability of one or more issue slots of the second in-order pipeline and priority of the data prefetch instruction.

* * * * *